(12) United States Patent
Kratz et al.

(10) Patent No.: US 12,019,838 B2
(45) Date of Patent: Jun. 25, 2024

(54) STANDARDIZED AR INTERFACES FOR IOT DEVICES

(71) Applicant: Snap Inc., Santa Monica, CA (US)

(72) Inventors: Sven Kratz, Mercer Island, WA (US); Andrés Monroy-Hernández, Seattle, WA (US); Yu Jiang Tham, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/841,365

(22) Filed: Jun. 15, 2022

(65) Prior Publication Data
US 2023/0409158 A1 Dec. 21, 2023

(51) Int. Cl.
*G06F 3/0481* (2022.01)
*G06F 3/01* (2006.01)
*G06F 3/04842* (2022.01)
*G06T 11/00* (2006.01)
*G16Y 40/10* (2020.01)

(52) U.S. Cl.
CPC ............ *G06F 3/0481* (2013.01); *G06F 3/017* (2013.01); *G06F 3/04842* (2013.01); *G06T 11/00* (2013.01); *G06T 2200/24* (2013.01); *G16Y 40/10* (2020.01)

(58) Field of Classification Search
CPC .... G06F 3/0481; G06F 3/017; G06F 3/04842; G06T 11/00; G06T 2200/24; G16Y 40/10
See application file for complete search history.

(56) References Cited

U.S. PATENT DOCUMENTS 10,901,689 B1  1/2021  Trim et al.
2015/0346701 A1* 12/2015  Gordon ................. G05B 15/02
                                                        700/275

(Continued)

FOREIGN PATENT DOCUMENTS

CN       111669430 A   * 9/2020  ........... H04L 67/125
KR    1020220080223 A    6/2022

OTHER PUBLICATIONS

Lei Chen, Method for Realizing Communication By Electronic Device "WO 2021218442"—Machine translation, Nov. 4, 2021 (Year: 2021).*

(Continued)

*Primary Examiner* — Tam T Tran
(74) *Attorney, Agent, or Firm* — Culhane Meadows PLLC; Stephen J. Weed

(57) ABSTRACT

An augmented reality (AR) device is interfaced to an Internet of Things (IoT) device by receiving IoT device information in a standardized schema from the IoT device. The IoT device information includes device inputs and available output information for the IoT device. A predetermined AR user interface widget to render for the IoT device is determined from the received IoT device information. The predetermined AR user interface widget converts user inputs to the AR device into the device inputs for the IoT device. Upon selection of the IoT device by the AR device, the predetermined AR user interface widget for the selected IoT device is provided to the AR device as an overlay on a display of the AR device. Device input received in response to user interaction with the AR user interface widget is provided to the IoT device in an input type expected by the IoT device.

20 Claims, 7 Drawing Sheets

(56) References Cited

U.S. PATENT DOCUMENTS

| | | |
|---|---|---|
| 2017/0256096 A1 | 9/2017 | Faaborg et al. |
| 2018/0196522 A1* | 7/2018 | Rochford ................ G06F 3/017 |
| 2019/0114061 A1 | 4/2019 | Daniels et al. |
| 2020/0043239 A1* | 2/2020 | Lee ....................... G06F 3/0488 |
| 2020/0092376 A1* | 3/2020 | Morris .................. H04L 67/125 |
| 2021/0097286 A1 | 4/2021 | Lehrich et al. |
| 2021/0149551 A1 | 5/2021 | Lee |
| 2023/0046155 A1 | 2/2023 | Lu et al. |

OTHER PUBLICATIONS

Ken Figueredo et al., A Scalable Standard-Based Approach for IoT Data Sharing and Ecosystem Monetization, Sep. 8, 2020, IEEE Internet of Things Journal, vol. 9, No. 8, pp. 5645-5652 (Year: 2020).*

Teemu Leppanen et al., Augmented Reality Web Applications with Mobile Agents in the Internet of Things, Sep. 1, 2014, IEEE International Conference on Next Generation Mobile Apps, Services and Technology, pp. 1-6 (Year: 2014).*

International Search Report and Written Opinion for International Application No. PCT/US2023/024830, dated Sep. 21, 2023 (Sep. 21, 2023)—11 pages.

International Search Report and Written Opinion for International Application No. PCT/US2023/024843, dated Sep. 26, 2023 (Sep. 26, 2023)—10 pages.

\* cited by examiner

STANDARDIZED AR INTERFACES FOR IOT DEVICES

CROSS-REFERENCE TO RELATED APPLICATIONS

This application is related to U.S. patent application Ser. No. 17/841,397, entitled "AR System for Providing Interactive Experiences in Smart Spaces", filed on Jun. 15, 2022. The content of that patent application is hereby incorporated by reference in its entirety.

TECHNICAL FIELD

The present subject matter relates to systems and methods for enabling users of camera-based augmented reality (AR) systems to interact with real-world Internet of Things (IoT) devices, and, more particularly, to systems and methods for providing standardized user interfaces that enable AR cameras to interact with many common IoT devices.

BACKGROUND

The so-called "Internet of Things" or "IoT" is a network of physical objects that are embedded with sensors, software, and other technologies for enabling connection and exchange of data with other devices via the Internet. For example, IoT devices are used in home automation to control lighting, heating and air conditioning, media and security systems, and camera systems. A number of IoT enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the Internet of Things infrastructure to achieve more efficient IoT operations, improve human-machine interactions, and enhance data management and analytics.

A growing number of IoT devices have become available for home consumers. These devices range from smart red, green, blue (RGB) light bulbs to automated plant watering systems. At the same time, the adoption of AR technology is growing, for instance in social messaging platforms such as SNAPCHAT®. Currently, augmented reality (AR) is mainly used to augment photos and videos and also for interactive applications (e.g., connected lenses games on SNAPCHAT®). However, little work has been done on the subject of using AR as an interface for connected IoT devices, the interfaces for which are currently a diverse mix of two-dimensional (2D) phone or web-based applications, often using different user experience designs for accomplishing the same basic tasks.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
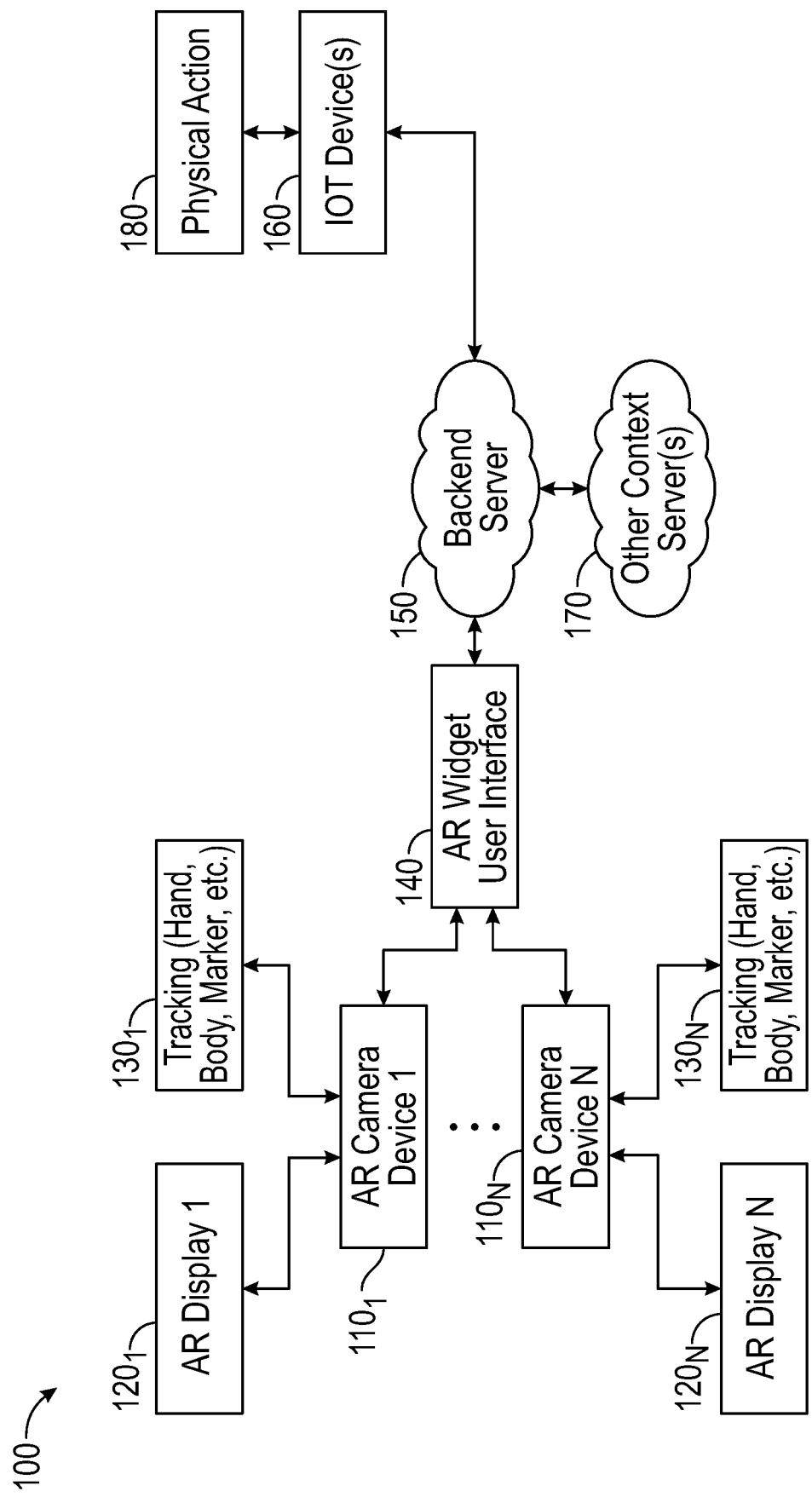
FIG. 1 is a general block diagram of a system for interfacing augmented reality (AR) camera devices to Internet of Things (IoT) devices.

While Augmented Reality (AR) technologies are becoming more ubiquitous, the control of IoT devices has largely remained in the domain of two-dimensional web or phone-based user interfaces, with very heterogeneous design choices. The systems and methods described herein pertain to utilizing AR camera interfaces to affect real-world Internet of Things (IoT) objects by providing standardized AR user interfaces for many common IoT devices.

The systems and methods described herein address the technical problems of mapping user interface parameters of IoT devices to a set of standardized AR user interface widgets and designing the AR user interface widgets to enable the input of certain variable types used by common IoT devices. As used herein, a "widget" is an application, or a component of an interface, that enables a user to perform a function or access a service.

To address these technical problems, the standardized AR user interfaces described herein map the IoT device input variables to the appropriate AR user interface widgets. A number of common IoT device input variable types and their corresponding mapping to AR gesture input interfaces for use with the system are described. By utilizing a camera on various messaging or AR platforms, such as SNAPCHAT® or SPECTACLES™ available from Snap, Inc. of Santa Monica, California, users may create fun and immersive ways of interacting with IoT devices through the standardized AR interfaces.

The system and method described herein interface an augmented reality (AR) device to an Internet of Things (IoT)

device by receiving IoT device information in a standardized schema. The IoT device information represents at least one device input and available output information for the IoT device. A predetermined AR user interface widget to render for the IoT device is determined from the received IoT device information. For example, the IoT device inputs and outputs may be mapped to the available standardized AR user interface widgets to determine which standardized AR user interface widgets can interpret the IoT device inputs and outputs. The predetermined AR user interface widget converts user inputs (e.g., gesture inputs) to the AR device into the at least one device input for the IoT device. Upon selection of the IoT device by the AR device, the predetermined AR user interface widget for the selected IoT device is provided to the AR device as an overlay on a display of the AR device. In response to user interaction with the predetermined AR user interface widget displayed by the AR device, an AR device input is converted into a device input type expected by the IoT device and provided to the IoT device.

The system described herein may include an AR device that interacts with or includes a registration module that receives IoT device information in the standardized schema. The AR device may also interact with or include a communication module that facilitates communication of input data from the AR device to the IoT device and state data from the IoT device to the AR device. An AR widget user interface may determine from the received IoT device information a predetermined AR user interface widget to render for the IoT device. The predetermined AR user interface widget for the IoT device may be provided to the AR device as an overlay on a display of the AR device. The predetermined AR user interface widget is adapted to convert user inputs from an input device of the AR device into the at least one device input for the IoT device. During use, the converted user inputs captured in response to user interaction with the AR user interface widget displayed by the AR device are provided to the IoT device to control operation of the IoT device.

The AR widget user interface may compare the received IoT device information to available standardized AR user interface widgets to determine at least one standardized AR user interface widget that can interpret the IoT device inputs and outputs, and select from the available standardized AR user interface widgets a standardized AR user interface widget that converts a user input into the AR device into an IoT device input in the form of, for example, a Boolean, a ranged numeric value, a two-dimensional relative value, a two-dimensional absolute value, a two-dimensional path, a three-dimensional path, a red, green, blue (RGB) color input, a time, or a text in accordance with a form of device input of the IoT device.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

There are several properties of AR that make it appealing for use in controlling IoT devices. At present, user interfaces for IoT devices are rather heterogeneous, with devices from different brands relying on different applications, e.g., on mobile devices, to control the IoT devices. To prevent the proliferation of similar heterogeneous applications in the realm of AR (or even virtual reality (VR)), a better approach would involve the IoT devices specifying their inputs in a generic manner, and, as suggested herein, use application programming interfaces (APIs) to provide input user interfaces for the IoT devices in a standardized way.

AR devices are spatially aware, and IoT devices are usually distributed in a user's space. These features makes it possible to select and manipulate a particular IoT device in AR by pointing to the IoT device's location in space, rather than selecting it from a (potentially long) list of available devices in two-dimensions. IoT devices may have an extended set of inputs, or multi-dimensional inputs. Spatial interaction using AR has the potential to extend beyond the mobile device's screen while still being understandable and navigable by the user. Also, spatial input modalities such as hand gestures are useful for inputting multi-dimensional variables (e.g., RGB color selection), in comparison with the options provided by a 2D touch screen.

To take advantage of these features, systems and methods are provided herein for using generic or "standardized" AR user interface widgets to support spatial input for IoT devices in AR applications. Also, a set of spatial AR user interface widgets for common inputs to IoT devices are described.

Reference now is made in detail to the examples illustrated in the accompanying FIGS. 1-10 and discussed below.

In its most basic form, the system includes one or more IoT devices, one or more AR devices, a backend server including a registration module and a dispatch (communication) module, and an AR widget user interface for the AR devices. FIG. 1 is a general block diagram of a system 100 for interfacing augmented reality (AR) camera devices to Internet of Things (IoT) devices in sample configurations. As illustrated, a plurality of AR enabled camera devices $110_1$ through $110_N$, such as Snapchat cameras adapted to include a messaging app such as SNAPCHAT® available from Snap, Inc. of Santa Monica, California, include AR displays $120_1$ through $120_N$, respectively, for displaying AR objects. The AR camera devices 110 may include a smartphone, a laptop, a desktop, an electronic eyewear device, a heads up display, or any other computing device that enables communications via the internet. The AR camera devices $110_1$ through $110_N$ may be further adapted to include software $130_1$ through $130_N$ to support features such as hand and body identification and tracking, marker tracking in AR space, and the like. Such features are readily available in messaging apps such as the aforementioned SNAPCHAT® messaging app.

The respective AR camera devices $110_1$ through $110_N$ may share a common AR widget user interface 140 in sample embodiments. It will be appreciated that the AR user interface widget and related object recognition services also may be performed by the software $130_1$ through $130_N$ running on each AR camera device $110_1$ through $110_N$ in sample configurations and that the common AR widget user interface 140 may be provided separately for each AR camera device 110 in sample configurations. As will be described in the examples below, the AR camera devices 110 may present AR user interface widgets to the AR display 120 of the AR camera device 110. The user may make selections using gesture inputs that are recognized by the software 130 to generate device inputs representative of the user selection. The device inputs are then provided to the IoT device(s) 160 to control physical action 180 of the IoT device(s) 160.

As will be explained in more detail with respect to FIG. 2, the backend server 150 acts as a bridge between the AR cameras devices 110 and the physical IoT devices 160. The backend server 150 also may send commands to the IoT devices 160 to act in any number of ways supported by the respective IoT devices 160. The IoT devices 160 may be controlled to perform desired physical actions 180 in response to user interaction with the AR camera devices $110_1$ through $110_N$ and to provide sensor outputs that initiate one or two-way interactions with the AR camera devices $110_1$ through $110_N$. Such two-way interactions may include the transfer of status information from the IoT devices 160 to respective AR camera devices 110. The backend server 150 also may be responsive to context information provided by other context servers 170. Such context information may include time of day, weather conditions, global positioning system (GPS) data, and any other information available from third party servers.

Figure 2:
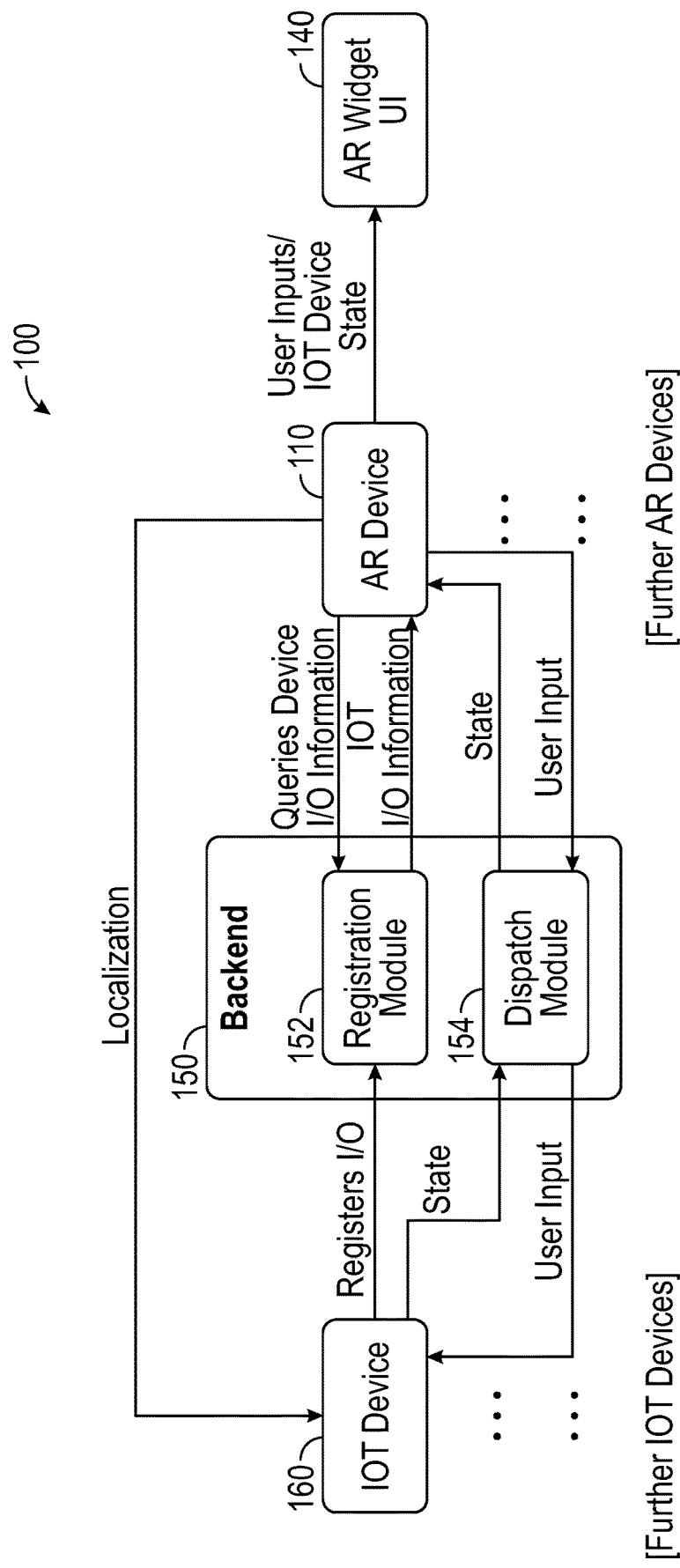
FIG. 2 is a block diagram of the components and information flow of the system of FIG. 1 in a sample configuration.

FIG. 2 is a block diagram of the components and information flow of the system 100 of FIG. 1 in a sample configuration. As illustrated, the system 100 includes IoT device(s) 160, AR device(s) 110, backend server 150, and AR widget user interface 140. System 100 provides standardized user interfaces that enable users of AR devices 110 to interact with one or more IoT devices 160 in a space.

The IoT devices 160 may be any available connected smart device known in the art. For example, the IoT devices 160 may include common household devices that a standard end user might encounter, e.g., RGB smart lamps, thermostats, smart speakers, smart switches, and the like. The examples provided herein do not provide interfaces to devices found in commercial spaces, e.g., devices that could be used to create specific interactive experiences for consumers. However, it will be appreciated by those skilled in the art that such IoT devices 160 may be adapted to work in the system described herein so long as such device provides connectivity to the AR device 110 and backend server 150 via WI-FI®, BLUETOOTH®, or other communications channels that enable Internet access, and the device also provides active or passive localization in the environment that can be received by the AR device 110. Active localization may be accomplished by radiofrequency (RF) beaconing, ultrasound, visual light signaling, or via a Global Positioning System (GPS) for outdoor applications. On the other hand, passive localization may be accomplished by saving the fixed location of the IoT devices 160 in the memory of the backend server 150 or AR device 110 or through a visual code near the IoT device 160 for selection or some other fiduciary that can be recognized by the AR device 110. The AR device 110 and the IoT device 160 also may conduct limited duplex communications to convert user input into the AR device 110 into a display of the AR user interface widget appropriate for the IoT device 160.

Since system 100 provides standardized interfaces for AR devices 110 to interact with IoT devices 160, a suitable form factor, e.g., smartphone, tablet, or glasses, for the AR device 110 is desired. In sample configurations, the AR device 110 provides connectivity with the backend server 150 or directly with IoT devices 160 via a communication channel that enables Internet access (e.g., WI-FI®, BLUETOOTH®, etc.) and also provides inside-out or outside-in localization capability. In one example, the localization capability of the AR device 110 generates a relative pose (position, orientation) between the AR device 110 and any IoT devices 160 to be controlled via AR user interface widgets in sample configurations. Also, in addition to standard input modalities (e.g., touch screens, buttons, trackpads, voice), the AR device 110 may support spatial input such as hand gesture or body gesture tracking.

Figure 3:
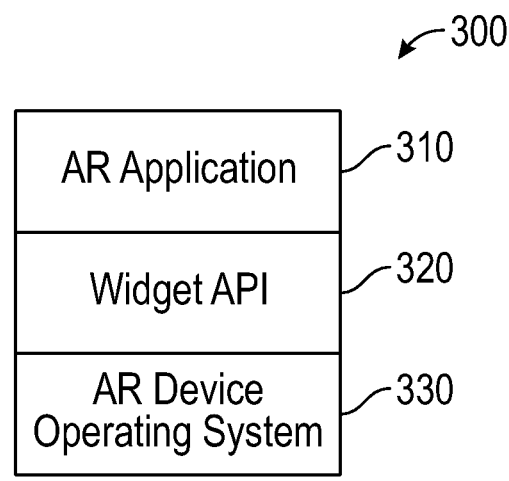
FIG. 3 is a block diagram of component layers including AR applications built upon the AR user interface widget that is exposed as an application programming interface (API) in a sample configuration.

FIG. 3 is a block diagram 300 of component layers including AR applications 310 built to run upon the AR widget user interface 320 that is exposed as an application programming interface (API) on a processor of the AR device 110 in a sample configuration. The API 320 in turn leverages capabilities of the AR device operating system 330 to communicate with the backend server 150 and to access other information such as position and orientation of the AR device 110 in space, as well as user input tracking events.

As shown in FIG. 2, the backend server 150 includes two main modules, a registration module 152 and a dispatch (communication) module 154. The registration module 152 is used by the IoT devices 160 to register their device inputs and the available output information. The IoT devices 160 may broadcast their presence to the backend server 150 upon power up to initiate the registration process. Conversely, the backend server 150 may periodically poll for new IoT devices 160. Inputs and outputs for the AR user interface widgets to be used for the respective IoT devices 160 can be specified to define the AR user interface widgets using a standardized schema, such as the following example JSON file showing a minimal configuration for controlling a smart light:

```
{
    "deviceUUID": "bd1b12ffcdf38f4e80b2ccd7d3660548",
    "deviceName": "Office Smart Light",
    "inputs": [
    {
    "name": "color",
    "type": "HSVPicker",
    "endpointURL": "http://10.0.0.36/lightControl"
    },
    {
    "name": "powerSwitch",
    "type": "boolean",
```

-continued

```
      "behavior": "latch"
    }
  ],
  "Outputs" :[
    {"name":"currentColor",
    "endpointURL": "http://10.0.0.36/lightStatus"}
  ]
}
```

Similarly, the AR devices 110 may use the registration module 152 to register with the backend server 150 and signal their readiness to receive updates from IoT devices 160 and also to send those IoT devices 160 AR updates. In addition, the AR device 110 may send its current location to the backend server 150, which may coordinate certain updates between the IoT devices 160 and the AR devices 110 (e.g., start sending a specific state to the AR device 110 or activating a certain input AR widget user interface (UI) 140 on the AR devices 110). However, certain parts of such logic could also run on the AR devices 110 locally.

The dispatch module 154 facilitates communication of input data from the AR device(s) 110 to the IoT device(s) 160 and state data (e.g., current temperature) from the IoT device(s) 160 to the AR device(s) 110. In some configurations, the IoT devices 160 may push out a preferred AR overlay that is communicated to the AR devices by the dispatch module 154.

It will be appreciated that the backend server 150 may run on a separate machine, or as a further API or system layer on the AR device operating system 330 of the AR device 110 itself as shown in FIG. 3.

The AR widget UI 140 selects and makes available to the user the AR user interface widgets that accept the inputs and outputs for interacting with the corresponding IoT devices 110 in sample configurations. The AR widget UI 140 is available as a widget API 320 layered in between AR applications 310 and the AR device's operating system 330 (FIG. 3) to applications running on the AR devices 110.

The AR widget UI 140 determines the type of AR user interface widget(s) to render for a given IoT device 160 that can interpret the inputs and outputs for the given IoT device 160 in accordance with the input and output information for the given IoT device 160 provided by the registration module 152. For example, the IoT device inputs and the available output information for the respective IoT devices 160 may be compared or mapped to the inputs and available output information for the available AR user interface widgets to determine which AR user interface widgets can interpret the IoT device inputs and outputs. The dispatch module 154 sends input captured by AR user interface widgets to the appropriate IoT device 160 or obtains and/or receives updates of state data from a given IoT device 160 for visualization on AR devices 110. The AR widget UI 140 transforms raw user input into inputs suitable for the IoT device 160 to control and transforms state data transmitted from IoT devices 160 into user-understandable representations and visualizations for display. For example, the AR widget UI 140 may map the AR devices 110 to the corresponding AR user interface widget for a given IoT device 160. The AR widget UI 140 may also draw graphics and specify the raw gesture data transformation that is needed to control a particular AR user interface widget. The raw gesture may be converted to a value as described below with respect to FIGS. 4-7. Also, state data from the IoT device 160 may be provided to the AR device 110 for display. Thus, the AR device 110 may receive feedback from the IoT device 160 via two-way communications for display to the user.

In the system 100, various AR interfaces are provided for common input variables for the IoT devices 160. A number of AR user interface widgets also may be used. These AR user interface widgets are designed to be generic and standardized to cover many common input data types for the IoT devices 160. The AR user interface widgets are designed for spatially-aware AR devices, and (for instance) can be activated when the user reaches the immediate vicinity of the IoT device 160 the user wishes to control. Conversely, the AR user interface widgets may be activated when the user is oriented to face the IoT device 160 to be controlled, the IoT device 160 is selected by a gesture input, or the IoT device 160 is selected by a multi-modal voice command.

Table 1 below provides a non-exhaustive list summarizing some of the common input variable data types for controlling IoT devices 160 and their possible embodiments as standardized AR user interface widgets (W1-W6) that provide the mechanics for manipulation of standard input variable data types. The standardized AR user interface widgets may have default values and may be customized based on user inputs to cover the known IoT device input/output combinations. Thus, the available predetermined AR user interface widgets for a particular IoT device may include standardized AR user interface widgets and AR user interface widgets that have been customized by the user.

TABLE 1

| Input Type | AR UI Widget Function | AR UI Widget Embodiment(s) |
|---|---|---|
| Boolean | (Widget W1) Momentary or selectable state switch | Crossing threshold of 2D plane, 3D volume, or spatial gesture classification |
| Ranged Numeric, Integer or Float | (Widget W2) Selectable Range of Numbers | Slider, dial, or property/interpretation of a spatial gesture |
| 2D - Relative | (Widget W3a) Measurement of relative 2D input | Direction force/resistance capture, measurement of relative 2D motion |
| 2D - Absolute | (Widget W3b) Absolute 2D position input | Selection of a location on a 2D plane (e.g., via ray intersection, placing a proxy object, or a spatial gesture) |
| 2D/3D Path | (Widget W3c) Input a sequence of 2D/3D coordinates | Dragging a path across a 2D plane (e.g., via ray intersection, dragging a proxy object, or a spatial gesture), or in a 3D volume |
| RGB Color Input | (Widget W4) Color Picker | Spatial HSV color picker, sample colors visible in the user's environment |
| Time | (Widget W5a) Clock/Timer (Widget W5b) Date | 3D embodiment of a clock or calendar; Can also be a combination of selectable |

TABLE 1-continued

| Input Type | AR UI Widget Function | AR UI Widget Embodiment(s) |
| --- | --- | --- |
| Text | (Widget W6) Input of short text strings | ranges as in W2 Virtual keyboard, Speech-to-Text, and hand gesture chording |

Possible AR user interface widget configurations for standardized AR user interface Widgets W1-W4 in Table 1 will be elaborated on below.

In an instantaneous or selectable state switch widget (Widget W1), a Boolean input may represent a true/false value sent to the IoT devices 160. The Boolean input can be either an instantaneous signal that is active only as long as the input is "held" by the user (e.g., a doorbell buzzer) or a state-holding switch (e.g., an on/off toggle switch). Possible ways to realize such an input with a spatial AR interface is by tracking if the user's hand or finger crosses the threshold of a 2D plane or into the interior of a 3D volume. 3D gesture classifiers also may be used to transmit either an instantaneous value, a true or false value, or a toggle between either of the aforementioned logic states.

In a selectable range of numbers widget (Widget W2), a selectable range of numbers has a lower and upper limit and a selection granularity, i.e., the interval between one selectable value and the previous selectable value or next selectable value. Selectable number ranges can usually be integers or floating point numbers, although the float selection precision is ultimately limited by the resolution of the input device or tracking method or the user's dexterity.

Figure 4:
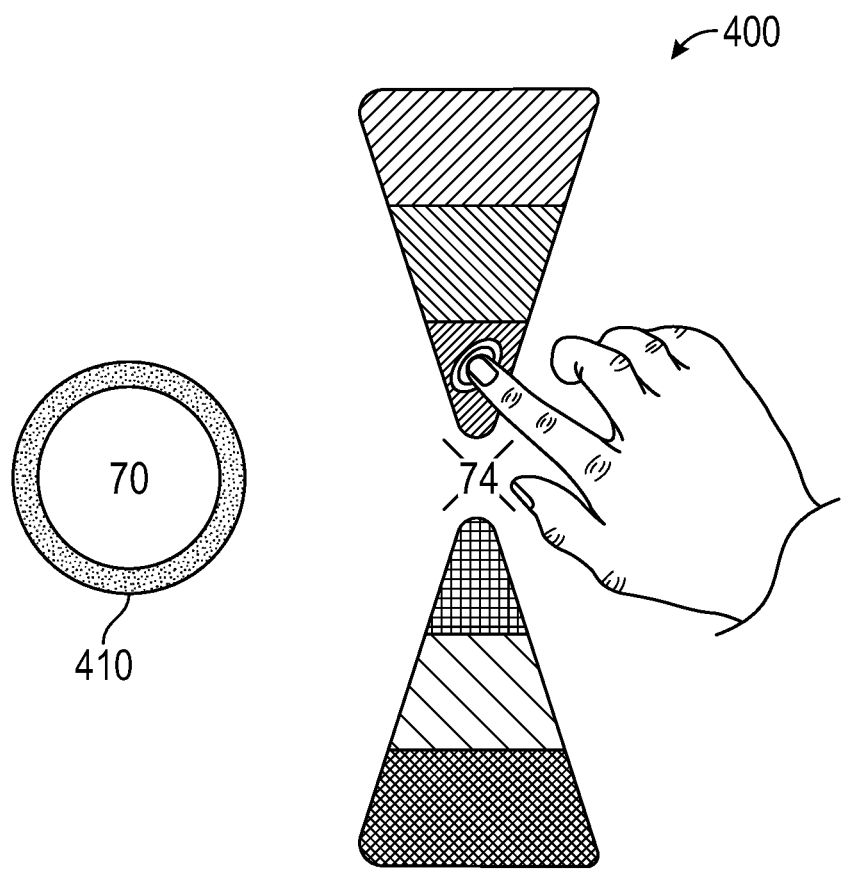
FIG. 4 is a diagram depicting a selectable number range widget in an example application for controlling a smart thermostat using a sample gesture input.

FIG. 4 is a diagram depicting a selectable number range AR user interface widget 400 in an example application for controlling a smart thermostat 410 using a sample gesture input. It is noted that the center of the range is set to the thermostat's previous target temperature. The AR user interface widget 400 may appear as a dynamic interface on the display of the user's AR device 110 based on proximity to a particular IoT device 160, such as the smart thermostat 410. The user may gesture as indicated relative to the AR user interface widget 400 to change the set point of the smart thermostat 410. The AR device 110 recognizes the user selection based on the user's gesture and provides the selection as a device input to the backend server 150 which, in turn, provides the device input to the particular IoT device 160, in this case smart thermostat 410.

Figure 5:
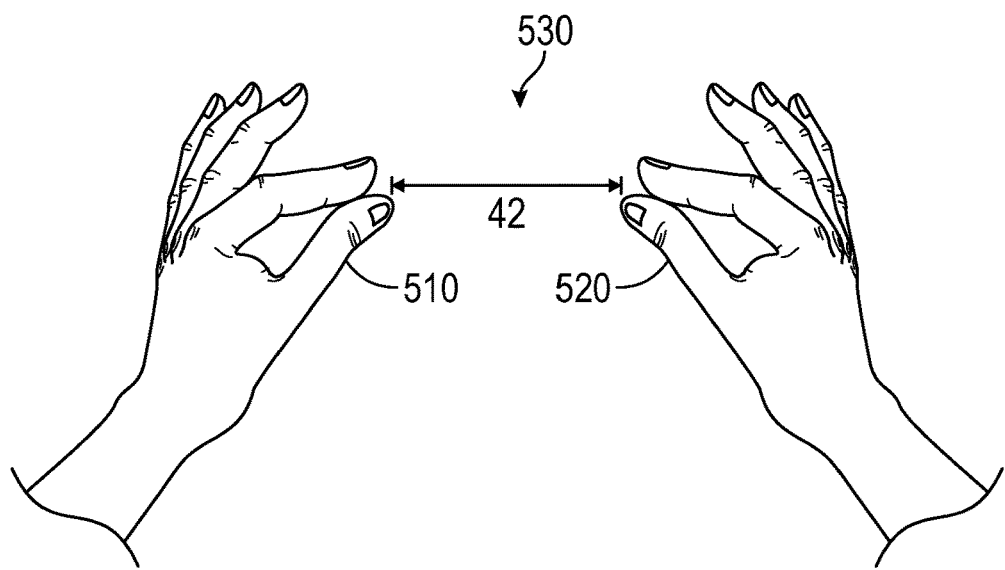
FIG. 5 is a diagram depicting a number range input formed by mapping a distance between hand pinches to a value in a sample gesture input.

A selectable number range may be selected using only hand gestures. A number range input may be specified by mapping the distance between two hand pinches to a value. For example, FIG. 5 is a diagram depicting a number range input formed by mapping a distance between hand pinches 510 and 520 to a value 530 in a sample gesture input.

Other possible ways to realize range selection inputs with a spatial AR interface include representing inputs as sliders along a numbered scale, or by representing such scales as circular dials. Slider handles or dials may be manipulated via hand and finger gestures, e.g., by "pinch and drag." More sophisticated ways to realize range selection inputs may use interpretations of certain parameters of spatial gestures, e.g., by mapping the distance between the user's hands to the input value range as shown in FIG. 5.

In a measurement of relative 2D input widget (Widget W3a), a relative 2D input measures the difference of the input value from a set centerpoint or starting value. This is similar to joystick or trackpoint inputs that track relative or absolute values along a track path. The former measures the degree of rotation away from the center on two axes while the latter measures the amount of force applied to the trackpoint in two dimensions. By way of example, a user may use the pinching gesture of FIG. 5 to raise or lower volume of an IoT device 160 by moving the user's hands further apart or closer together, respectively. As an example, a value (such as volume) may pop up on the display of the user's AR device 110 when the user is in proximity of the IoT device 160. The user may use a gesture to adjust the value for the IoT device 160 by, for example, moving the user's hands closer together or further apart as just described. The AR device 110 recognizes the user selection based on the user's gesture and provides the selection as a device input to the backend server 150 which, in turn, provides the device input to the particular IoT device 160 that is responsive to a number range input.

Relative 2D input can be realized on an AR device 110 with spatial input in a number of ways. A first possibility is by measuring the (2D) displacement from a starting point during a drag gesture. A second possibility is setting a certain movement speed threshold and mapping movement speed and direction at the crossing of the threshold to a relative 2D input. Alternative approaches may use untethered force-feedback controllers or force transducers and sensors mounted on the user's hand and/or fingers. The user's own motion relative to a designated point in space also may be used as a relative 2D input.

In spatial AR interfaces, an absolute 2D input may be realized by selecting a location on a 2D plane via ray intersection, moving a proxy object on a 2D plane, or by a direct spatial gesture. Alternative methods may include creating a virtual projection of the "UI map" onto the floor of the user's environment and using the user's current coordinates on this projection as an absolute 2D input. As in the other examples, the AR device 110 recognizes the user selection based on the user's gesture and provides the selection as a device input to the backend server 150 which, in turn, provides the device input to the particular IoT device 160 expecting the absolute 2D input.

In an absolute 2D position input widget (Widget W3b), an absolute 2D position input maps a 2D value from a user input coordinate system to a coordinate system used by the IoT device 160 to be controlled directly. For instance, this type of input allows users to select a real-world location from a "mini-map" in the user interface. The coordinates selected by the user in the user interface are recognized by the user's AR device as a device input and provided to the backend server 150 which, in turn, map the device input from user interface coordinates to real-world coordinates that are provided to the IoT device 160.

Figure 6:
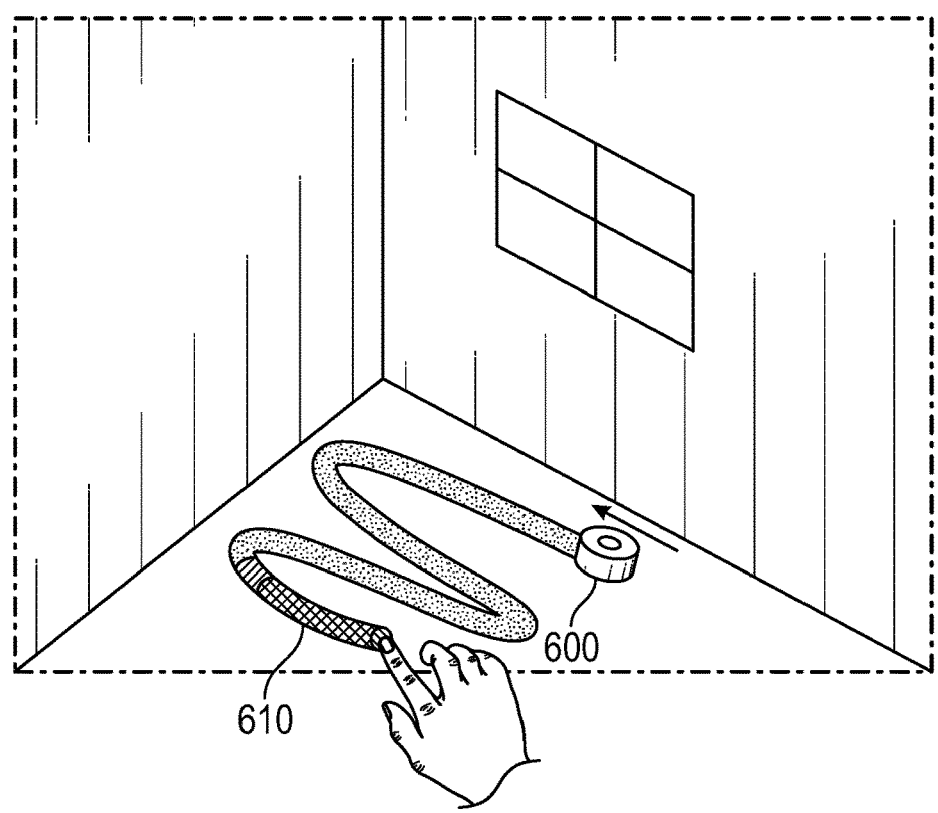
FIG. 6 is a diagram depicting control of a mobile robot along a two-dimensional path using tracked finger coordinates provided via a sample gesture input.

For a widget for inputting a sequence of coordinates (Widget W3c), FIG. 6 illustrates a diagram depicting control of a mobile robot 600 along a two-dimensional path using tracked finger coordinates provided via a sample gesture input 610. The tracked finger coordinates are projected onto the floor of the user's environment in a perspective-correct way. A 2D or 3D path can be defined by inputting a sequence of coordinates. Paths can, for instance, be used to define the motion of the mobile robot 600 in a certain area. In the 2D case, paths may be input via spatial AR by using ray intersections on planes, dragging proxy objects on planes, or by using spatial gestures 610 as shown in FIG. 6. To create 3D paths, proxy objects may be dragged in a 3D volume or direct 3D gestures may be performed to designate the desired path. 2D paths on the ground can be directly input spatially by drawing on the floor of the user's environment by, for example, projecting the user's finger motion onto the environment's floor, as shown in FIG. 6. Alternatively, the path may be designated by speaking a trigger word(s) and then pointing to the desired destination. For each case, the AR device 110 recognizes the user selection based on the user's gesture and provides the selection as a device input to the backend server 150 which, in turn, provides the device input to the particular IoT device 160 as, for example, coordinates of the desired path.

To implement a color picker widget (Widget W4), the color picker widget allows the user to select a specific color as an input, e.g., to change the color of a smart light bulb. In many applications, colors are represented as RGB (Red, Green, Blue) or HSV (Hue, Saturation, Value) triplets, although there are many other color space representations to choose from. Color pickers can present an array of preselected colors or allow the user to choose the desired color in a "freeform" manner, e.g., from a color circle. HSV is commonly used in freeform color pickers.

Figure 7:
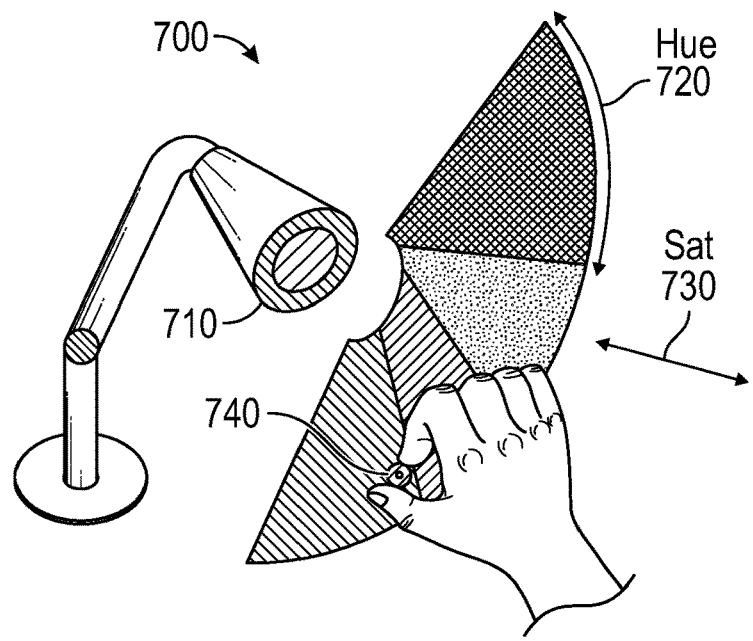
FIG. 7 is a diagram depicting a hue, saturation, value (HSV) color picker for a smart light that is controlled using hand gestures.

FIG. 7 is a diagram depicting a spatial AR user interface for a 3D HSV color picker 700 for a smart light 710 that is controlled by an AR device 110 using hand gestures. In sample configurations, the HSV color picker 700 materializes on the display of the AR camera device 110 when the user comes into the vicinity of the light 710 to interact with it. As shown in FIG. 7, hue may be adjusted by the user interacting with the HSV color picker 700 by moving her finger or hand up or down in the color circle segment as shown at 720, saturation may be adjusted by the user interacting with the HSV color picker 700 by moving her finger or hand closer or further away from the lamp 710 as shown at 730, and the brightness value may be adjusted by the user interacting with the HSV color picker by moving her finger or hand in the Z direction orthogonal to the hue and saturation axes, for example, at point 740. The AR device 110 recognizes the user selection based on the user's gesture interacting with the color picker 700 and provides the selection as a device input to the backend server 150 which, in turn, provides the device input to a particular IoT device 160, in this case light 710.

It will be appreciated that fixed color palette selections may be implemented using Boolean type widgets. A spatial AR user interface may also implement a 3D HSV color picker as shown in FIG. 7. As illustrated, users may pick hue and saturation by selecting a point on the color circle (X and Y axes), e.g., by finger gesture, and the brightness value by moving their hands forwards or back along the Z axis. Alternative ways of color picking in an AR user interface could use more direct interactions by the user with the physical environment. For instance, by using image and touch location tracking of the camera of the AR device 110, the user could select a color from a real-world object by touching the real-world object. The AR user interface would then assign the color at the touched location to the selection. A similar color selection technique also may be employed with virtual objects in the AR environment.

Figure 8:
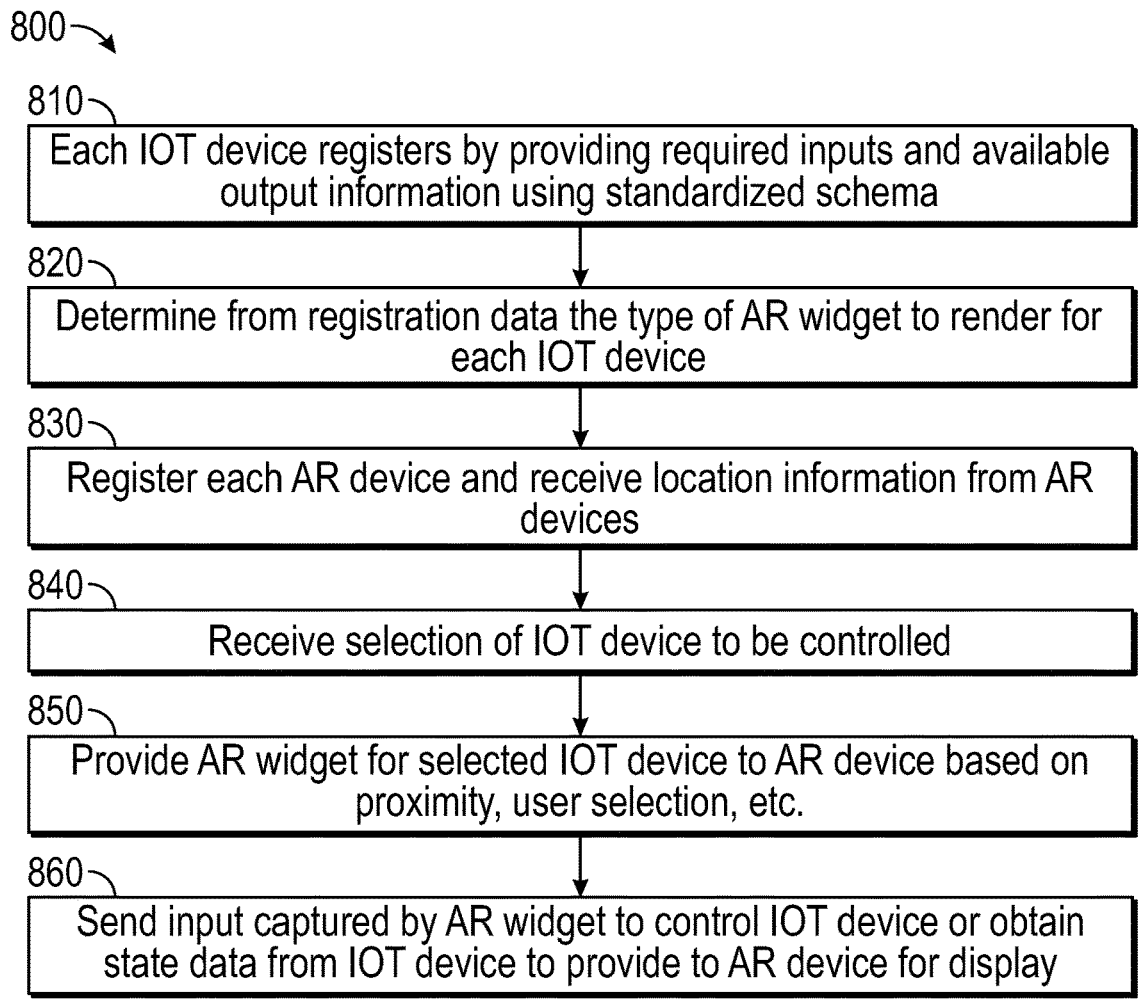
FIG. 8 is a flow chart of a method for interfacing an AR camera device to IoT devices via standardized AR interfaces in a sample configuration.

FIG. 8 is a flow chart of a method 800 for interfacing an AR camera device 110 to IoT devices 160 via standard AR interfaces in a sample configuration. The method may be implemented by the server 150 (FIG. 2) alone, by an AR device 110 that implements the server functions, or by a combination of the server 150 and one or more AR devices 110.

As illustrated in FIG. 8, each IoT device 160 registers with the server 150 by providing its device inputs (see, e.g., Table 1) and available output information using a standardized schema at 810. At 820, the server 150 determines from the registration data provided by the IoT device 160 the type of AR user interface widget to render for each IoT device 160. For example, the IoT device inputs and outputs may be mapped to the available standardized AR user interface widgets to determine which standardized AR user interface widgets can interpret the IoT device inputs and outputs. This information may be stored in a table on the server 150 or in the AR device 110. Each AR device 110 is also registered at 830. Location information for each AR device 110 also may be obtained at 830.

During operation, the server 150 receives a selection of the IoT device 160 to be controlled by an AR device 110 at 840. As noted above, the selection may be based on proximity of the AR device 110 to the IoT device 160, verbal input from the user, by orientation of the AR device 110 toward the IoT device 160, and the like. At 850, the AR user interface widget for the selected IoT device 160 is provided to the AR device as an overlay on the display of the AR device 110. The AR user interface widget may automatically appear or may be selected by the user. Once the AR user interface widget has been displayed to the user, input captured by the AR user interface widget (e.g., user gestures) may be converted by the AR user interface widget to IoT device inputs in a format appropriate for the IoT device 160 and provided to the IoT device 160 to control the operation of the IoT device 160. Conversely, state data from the IoT device 160 may be provided to the display of the AR device 110 at 860. Thus, the AR device 110 may recognize the user selection based on the user's gesture relative to the displayed AR user interface widget and provide the selection as a device input to the backend server 150 which, in turn, provides the device input to the particular IoT device 160.

The selection of the IoT device 160 to be controlled, the provision of the AR user interface widget for the selected IoT device 160, and interaction with the AR user interface widget (e.g., by user gestures) to generate device inputs to control the IoT device 160 and reception of state data from the IoT device 160 may be repeated for each registered IoT device 160 and each AR device 110.

In one use-case example, a user wears an AR device 110 and enters his home office in the morning to set it up for the day. He goes near his IoT enabled desk lamp, which is currently turned off. Based on the proximity of the user's AR device 110 to the IoT enabled desk lamp, an "On/Off" button AR user interface widget (Widget W1) appears next to the desk lamp in his view as an AR overlay on his AR device 110. He extends the index finger of his right hand and taps the AR user interface widget. The desk lamp turns on. However, it is still set to a "warm light" yellow/brown color from the night before when the user was relaxing. To change the color of the light, the user moves his hand closer to the light bulb of the desk lamp and an AR color picker (Widget W4) appears. The user selects a more blueish and brighter light tone using the displayed picker and a pinch hand gesture as illustrated in FIG. 7. It feels a bit chilly in the room, so the user moves near one of the air ducts in the room. A virtual thermostat control (Widget W2) for an IoT enabled thermostat appears on the AR overlay on his AR device 110 based on proximity of the user's AR device 110 to the air ducts. The user uses a double pinch gesture and moves his hands apart as shown in FIG. 5 to raise the preset temperature for the room. Now that his work environment is set up (and without physically touching anything in the room), the user may get to work.

System Configuration

Figure 9:
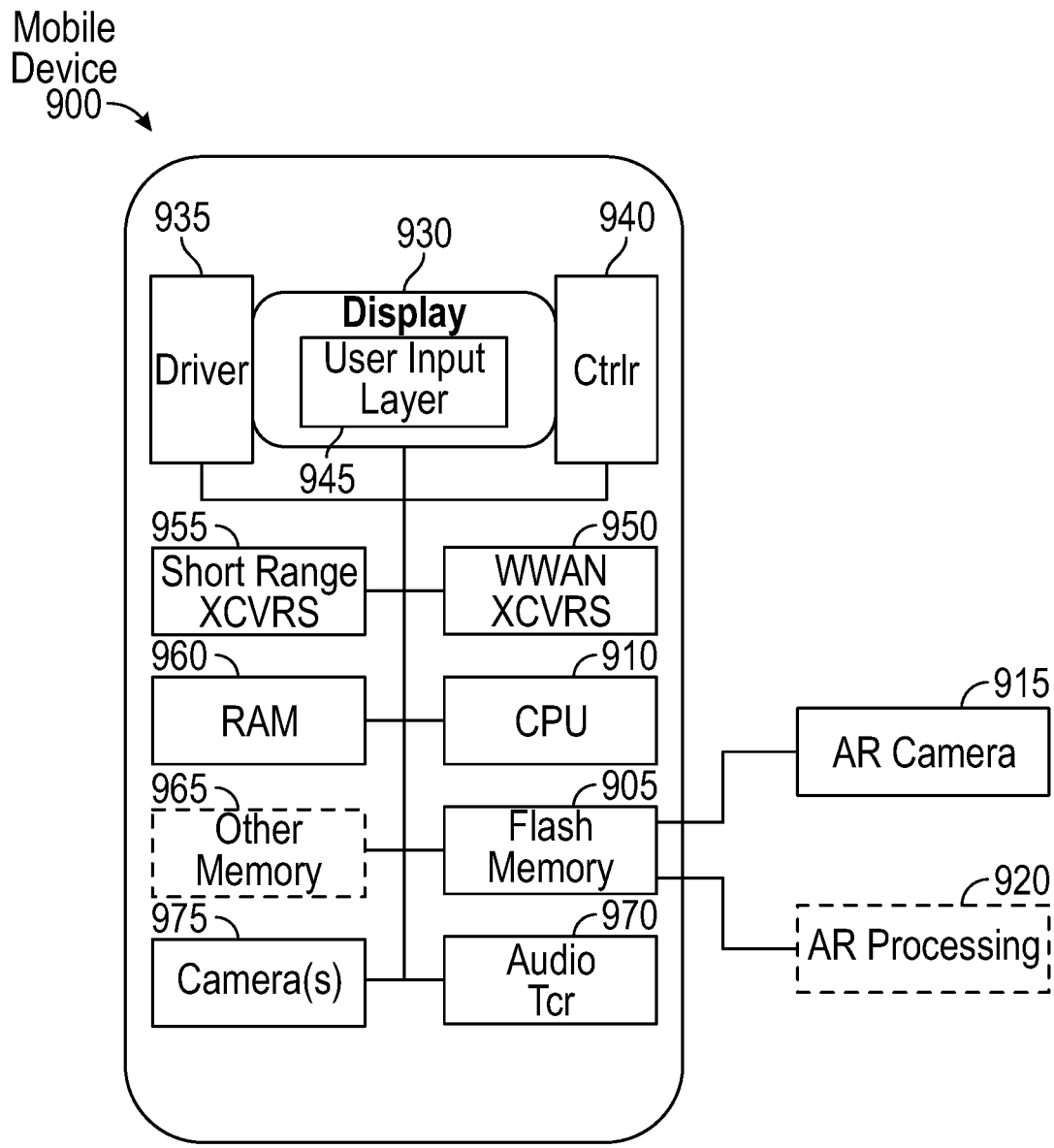
FIG. 9 illustrates a sample configuration of a mobile phone adapted to operate as an AR camera device in sample configurations.

FIG. 9 illustrates a sample configuration of a mobile device 900 adapted to interface an AR camera device 110 with IoT devices 160 in sample configurations. In particular, FIG. 9 is a high-level functional block diagram of an example mobile device 900 that a user may use as the AR camera devices 110 described herein. Mobile device 900 may include a flash memory 905 that stores programming to be executed by the CPU 910 to perform all or a subset of the functions described herein. For example, the flash memory may store AR camera software 915 and optionally may contain AR processing software 920 for execution by CPU 910 to enable the user of the mobile device 900 to display and interact with AR objects presented by the AR camera device 110 as described herein. The mobile device 900 may further include a camera 975 that comprises one or more visible-light cameras (first and second visible-light cameras with overlapping fields of view) or at least one visible-light camera and a depth sensor with substantially overlapping fields of view. Flash memory 905 may further include multiple images or video, which are generated via the camera 975.

The mobile device 900 may further include an image display 930, a mobile display driver 935 to control the image display 930, and a display controller 940. In the example of FIG. 9, the image display 930 may include a user input layer 945 (e.g., a touchscreen) that is layered on top of or otherwise integrated into the screen used by the image display 930. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 9 therefore provides a block diagram illustration of the example mobile device 900 with a user interface that includes a touchscreen input layer 945 for receiving input (by touch, multi-touch, or gesture, and the like, by hand, stylus, or other tool) and an image display 930 for displaying content.

As shown in FIG. 9, the mobile device 900 includes at least one digital transceiver (XCVR) 950, shown as WWAN XCVRs, for digital wireless communications via a wide-area wireless mobile communication network. The mobile device 900 also may include additional digital or analog transceivers, such as short-range transceivers (XCVRs) 955 for short-range network communication, such as via NFC, VLC, DECT, ZigBee, BLUETOOTH®, or WI-FI®. For example, short range XCVRs 955 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 900, the mobile device 900 also may include a global positioning system (GPS) receiver. Alternatively, or additionally, the mobile device 900 may utilize either or both the short range XCVRs 955 and WWAN XCVRs 950 for generating location coordinates for positioning. For example, cellular network, WI-FI®, or BLUETOOTH® based positioning systems may generate very accurate location coordinates, particularly when used in combination. Such location coordinates may be transmitted to the mobile device 900 over one or more network connections via XCVRs 950, 955.

The transceivers 950, 955 (i.e., the network communication interface) may conform to one or more of the various digital wireless communication standards utilized by modern mobile networks. Examples of WWAN transceivers 950 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 950, 955 provide two-way wireless communication of information including digitized audio signals, still image and video signals, web page information for display as well as web-related inputs, and various types of mobile message communications to/from the mobile device 900.

The mobile device 900 may further include a microprocessor that functions as the central processing unit (CPU) 910. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 910. The CPU 910, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 910 or processor hardware in smartphone, laptop computer, and tablet.

The CPU 910 serves as a programmable host controller for the mobile device 900 by configuring the mobile device 900 to perform various operations, for example, in accordance with instructions or programming executable by CPU 910. For example, such operations may include various general operations of the mobile device 900, as well as operations related to the programming for messaging apps and AR camera applications on the mobile device 900. Although a processor may be configured by use of hardwired logic, typical processors in mobile devices are general processing circuits configured by execution of programming.

The mobile device 900 further includes a memory or storage system, for storing programming and data. In the example shown in FIG. 9, the memory system may include flash memory 905, a random-access memory (RAM) 960, and other memory components 965, as needed. The RAM 960 may serve as short-term storage for instructions and data being handled by the CPU 910, e.g., as a working data processing memory. The flash memory 905 typically provides longer-term storage.

Hence, in the example of mobile device 900, the flash memory 905 may be used to store programming or instructions for execution by the CPU 910. Depending on the type of device, the mobile device 900 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 900 may include an audio transceiver 970 that may receive audio signals from the environment via a microphone (not shown) and provide audio output via a speaker (not shown). Audio signals may be coupled with video signals and other messages by a messaging application or social media application implemented on the mobile device 900. Also, the audio signals may include verbal commands from the user in relation to the IoT devices (e.g., "turn ON lamp").

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 10:
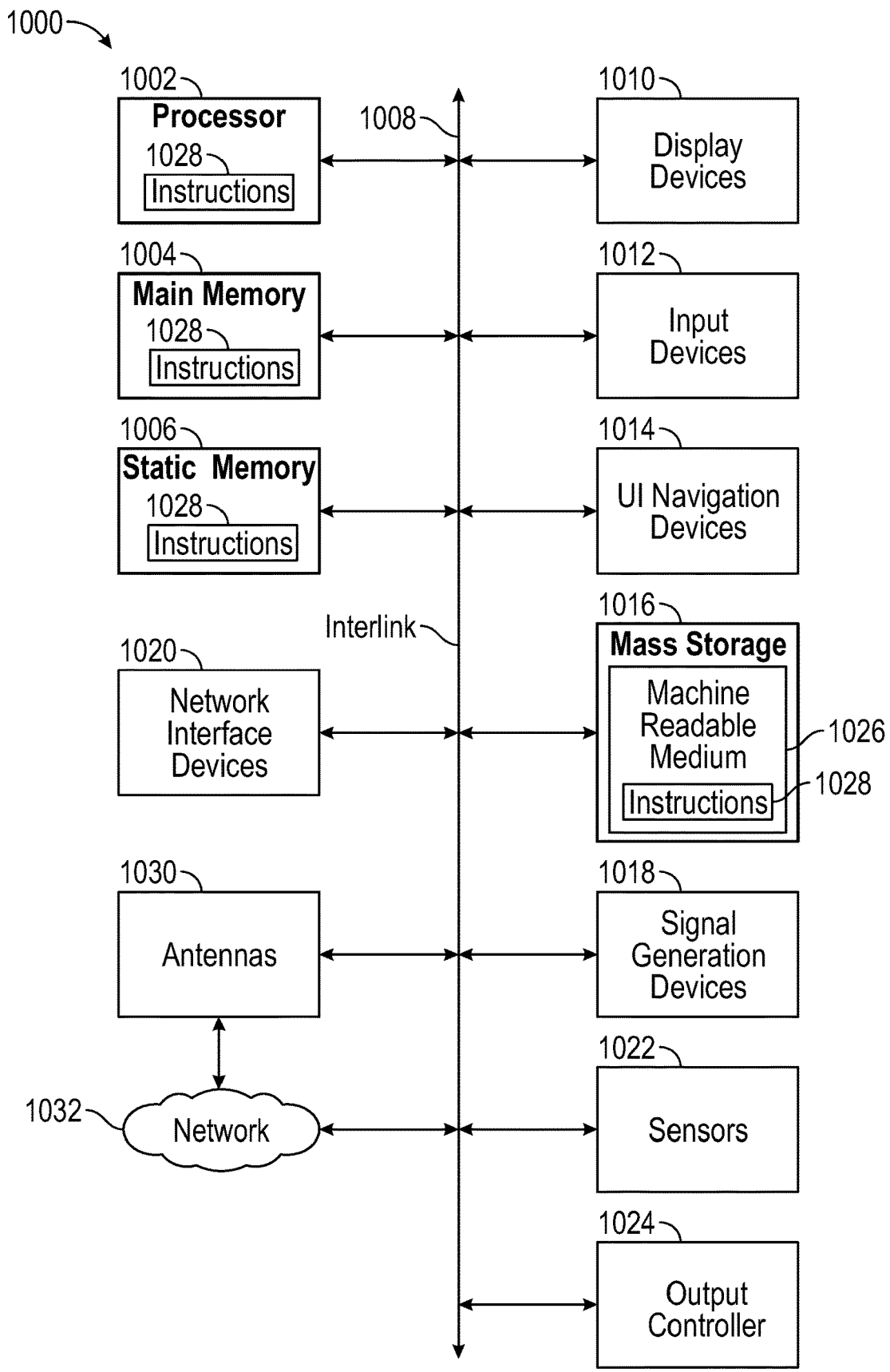
FIG. 10 illustrates a sample configuration of a computer system adapted to implement the backend server systems and methods described herein.

FIG. 10 illustrates a sample configuration of a computer system adapted to implement the systems and methods described herein. In particular, FIG. 10 illustrates a block diagram of an example of a machine 1000 upon which one or more configurations of the AR camera device 110, AR widget user interface 140, backend server 150, and context servers 170 may be implemented. In alternative configurations, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. In sample configurations, the machine 1000 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1000 may serve as a workstation, a front-end server, or a back-end server of a communication system. Machine 1000 may implement the methods described herein by running the software used to implement the features for enabling AR devices 110 to control IoT devices 160 as described herein. Further, while only a single machine 1000 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010 (shown as a video display), an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1022. Example sensors 1022 include one or more of a global positioning system (GPS) sensor, compass, accelerometer, temperature, light, camera, video camera, sensors of physical states or positions, pressure sensors, fingerprint sensors, retina scanners, or other sensors. The machine 1000 also may include an output controller 1024, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1016 may include a machine readable medium 1026 on which is stored one or more sets of data structures or instructions 1028 (e.g., software) embodying or utilized by any one or more of the techniques or functions described herein. The instructions 1028 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the mass storage device 1016 may constitute machine readable media.

While the machine readable medium 1026 is illustrated as a single medium, the term "machine readable medium" may include a single medium or multiple media (e.g., at least one of a centralized or distributed database, or associated caches and servers) configured to store the one or more instructions 1028. The term "machine readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. The machine readable media includes machine readable media that is not a transitory propagating signal.

The instructions 1028 may further be transmitted or received over communications network 1032 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas 1030 to connect to the communications network 1032. In an example, the network interface device 1020 may include a plurality of antennas 1030 to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the AR device 110, backend server 150, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF)

and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of interfacing an augmented reality (AR) device to an Internet of Things (IoT) device, comprising:
   receiving IoT device information in a standardized schema, the IoT device information representing at least one device input and available output information for the IoT device;
   determining from the received IoT device information a predetermined AR user interface widget to render for the IoT device, the predetermined AR user interface widget converting user inputs to the AR device into the at least one device input for the IoT device in the form of at least one of a Boolean, a ranged numeric value, a two-dimensional relative value, a two-dimensional absolute value, a two-dimensional path, a three-dimensional path, a red, green, blue (RGB) color input, a time, or a text in accordance with a form of the IoT device input of the IoT device;
   receiving a selection of the IoT device;
   providing the predetermined AR user interface widget for the selected IoT device to the AR device as an overlay on a display of the AR device;
   in response to user interaction with the predetermined AR user interface widget displayed by the AR device, receiving the at least one device input for the IoT device; and
   providing the at least one device input to the IoT device.

2. The method of claim 1, further comprising receiving location information from the AR device.

3. The method of claim 2, further comprising selecting the IoT device based on a proximity of the AR device to the IoT device.

4. The method of claim 2, further comprising selecting the IoT device based on verbal input from the user or based on an orientation of the AR device toward the IoT device.

5. The method of claim 1, further comprising automatically presenting the predetermined AR user interface widget upon selection of the IoT device.

6. The method of claim 1, further comprising receiving state data from the IoT device and providing the state data to the display of the AR device.

7. The method of claim 1, wherein receiving AR device input in response to user interaction with the predetermined AR user interface widget displayed by the AR device comprises receiving hand gestures or body gestures from the user.

8. The method of claim 1, wherein receiving IoT device information comprises registering the IoT device in response to the IoT device broadcasting its presence to a backend server upon power up or the backend server periodically polling for new IoT devices.

9. The method of claim 1, wherein providing the predetermined AR user interface widget for the selected IoT device to the AR device as an overlay on the display of the AR device comprises the IoT device, upon selection of the IoT device, pushing out a preferred AR overlay that is communicated to the AR device.

10. The method of claim 1, wherein determining the predetermined AR user interface widget to render for the IoT device comprises comparing the received IoT device information to available standardized AR user interface widgets to determine at least one standardized AR user interface widget that can interpret the IoT device inputs and outputs, and selecting from the available standardized AR user interface widgets a standardized AR user interface widget as the predetermined AR user interface widget.

11. An augmented reality (AR) device that interfaces to an Internet of Things (IoT) device, the AR device comprising:
  a display;
  a user input device;
  a registration module that receives IoT device information in a standardized schema, the IoT device information representing at least one device input and available output information for the IoT device;
  an AR widget user interface that determines from the received IoT device information a predetermined AR user interface widget to render for the IoT device, the predetermined AR user interface widget for the IoT device being provided to the AR device as an overlay on the display, the predetermined AR user interface widget being adapted to convert user inputs from the user input device into the at least one device input for the IoT device in the form of at least one of a Boolean, a ranged numeric value, a two-dimensional relative value, a two-dimensional absolute value, a two-dimensional path, a three-dimensional path, a red, green, blue (RGB) color input, a time, or a text in accordance with a form of the IoT device input of the IoT device; and
  a communication module that provides to the IoT device the at least one device input converted from user input to the user input device.

12. The AR device of claim 11, further comprising a processor that implements an operating system, wherein the registration module and communication module are implemented by the processor via an application programming interface or system layer of the operating system.

13. The AR device of claim 11, wherein the AR widget user interface maps multiple AR devices to a corresponding AR widget user interface for the IoT device.

14. The AR device of claim 13, wherein the AR widget user interface draws graphics and specifies a gesture data transformation that is needed to control the corresponding AR widget user interface for the IoT device.

15. The AR device of claim 11, wherein the communication module receives location information of the AR device and selects the IoT device based on a proximity of the AR device to the IoT device.

16. The AR device of claim 11, wherein the communication module receives verbal input from the user or orientation data regarding orientation of the AR device toward the IoT device and selects the IoT device based on the verbal input from the user or based on the orientation data.

17. The AR device of claim 11, wherein the AR widget user interface automatically presents the predetermined AR user interface widget to the AR device when the AR device is within a predetermined distance from the IoT device.

18. The AR device of claim 11, wherein the communication module receives state data from the IoT device and provides the state data to the display of the AR device.

19. The AR device of claim 11, wherein the AR widget user interface selects the predetermined AR user interface widget to render for the IoT device by comparing the received IoT device information to available standardized AR user interface widgets to determine at least one standardized AR user interface widget that can interpret the IoT device inputs and outputs, and selects from the available standardized AR user interface widgets a standardized AR user interface widget as the predetermined AR user interface widget.

20. A non-transitory computer readable medium having stored thereon instructions, wherein execution of the instructions by one or more processors cause the one or more processors to interface an augmented reality (AR) device to an Internet of Things (IoT) device by performing operations including:
  receiving IoT device information in a standardized schema, the IoT device information representing at least one device input and available output information for the IoT device;
  determining from the received IoT device information a predetermined AR user interface widget to render for the IoT device, the predetermined AR user interface widget converting user inputs to the AR device into the at least one device input for the IoT device in the form of at least one of a Boolean, a ranged numeric value, a two-dimensional relative value, a two-dimensional absolute value, a two-dimensional path, a three-dimensional path, a red, green, blue (RGB) color input, a time, or a text in accordance with a form of the IoT device input of the IoT device;
  receiving a selection of the IoT device;
  providing the predetermined AR user interface widget for the selected IoT device to the AR device as an overlay on a display of the AR device
  in response to user interaction with the predetermined AR user interface widget displayed by the AR device, receiving the at least one device input for the IoT device; and
  providing the at least one device input to the IoT device.

* * * * *